United States Patent [19]
Okawa et al.

[11] Patent Number: 6,069,990
[45] Date of Patent: May 30, 2000

[54] OPTICAL WAVELENGTH MULTIPLEXER/ DEMULTIPLEXER

[75] Inventors: Masahiro Okawa; Hisato Uetsuka; Hideaki Arai; Koichi Maru, all of Ibaraki, Japan

[73] Assignee: Hitachi Cable Ltd., Tokyo, Japan

[21] Appl. No.: 09/089,418

[22] Filed: Jun. 3, 1998

[30] Foreign Application Priority Data

Nov. 27, 1997 [JP] Japan .................................... 9-325622
Jan. 30, 1998 [JP] Japan ................................. 10-019704

[51] Int. Cl.$^7$ ..................................................... H04J 14/02
[52] U.S. Cl. ................................ 385/43; 385/24; 385/39; 385/37; 385/31; 385/50; 359/124; 359/115
[58] Field of Search .................................. 385/43, 39, 37, 385/31, 50, 24; 359/130, 127, 124, 115

[56] References Cited

U.S. PATENT DOCUMENTS

| | | | |
|---|---|---|---|
| 5,706,377 | 1/1998 | Li | 385/37 |
| 5,926,298 | 7/1999 | Li | 359/120 |
| 5,982,960 | 11/1999 | Akiba | 385/24 |

FOREIGN PATENT DOCUMENTS

8-122557  5/1996  Japan .

OTHER PUBLICATIONS

"Flat Spectral Response Arrayed–Waveguide Grating Mulitplexer with Parabolic Waveguide Horns", K. Okamoto et al., Electronics Letters, vol. 32 No. 18, pp. 1661–1662.

*Primary Examiner*—Cassandra Spyrou
*Assistant Examiner*—Leo Boutsikaris
*Attorney, Agent, or Firm*—McDermott, Will & Emery

[57] ABSTRACT

An optical wavelength multiplexer/demultiplexer, comprising: a substrate: and, provided thereon, input waveguides, output waveguides, an array waveguide diffraction grating comprising a plurality of waveguides with a predetermined difference in length being provided between the waveguides, an input slab waveguide for connecting the input waveguides to the array waveguide diffraction grating, an output slab waveguide for connecting the output waveguides to the array waveguide diffraction grating, and multimode waveguides, for example, tapered waveguides and parabolic waveguides, provided in a connecting section between the input waveguides and the input slab waveguide. The output slab waveguide may have a smaller radius than the input slab waveguide to narrow the width of the electric field distribution on the output side. The above construction can bring wavelength characteristics to a rectangular form to broaden the transmission band and at the same time can reduce the loss.

5 Claims, 9 Drawing Sheets

FIG. 2D PRIOR ART $$W(z) = \sqrt{(2\alpha\lambda/n_{eff})z + W_0^2}$$

FIG. 3D $$W(z) = \sqrt{(2\alpha\lambda/n_{eff})z + W_1^2}$$

OPTICAL WAVELENGTH MULTIPLEXER/DEMULTIPLEXER

FIELD OF THE INVENTION

This invention relates to an optical wavelength multiplexer/demultiplexer for multiplexing or demultiplexing of a wavelength-division multiplexed signal, and particularly to an optical wavelength multiplexer/demultiplexer which has a wide transmission band and can reduce loss.

BACKGROUND OF THE INVENTION

In the field of optical communication, a wavelength-division multiplex transmission system has been studied wherein a plurality of signals are put respectively on light in its plurality of different wavelengths and the light loaded with the plurality of signals are transmitted through one optical fiber to increase communication capacity. In this system, an optical wavelength-division multiplexer/demultiplexer for multiplexing or demultiplexing a plurality of lights having different wavelengths plays an important role. Among others, an optical wavelength multiplexer/demultiplexer using an array wavelength diffraction grating can increase the number of wavelengths multiplexed at a narrow wavelength spacing, and hence is promising.

For the optical wavelength multiplexer/demultiplexer used in the wavelength-division multiplexed transmission system, broadening and flattening of the wavelength transmission band, steep rise and fall in the transmission band are important in connection with the wavelength control tolerance of a semiconductor laser source, gain characteristics of an optical fiber amplifier, wavelength characteristics of a dispersive compensating fiber and the like. An optical wavelength multiplexer/demultiplexer which brings an electric field distribution of signal light to a near rectangular form at the interface of input waveguides and an input slab waveguide has been proposed in order to broaden the transmission band. In this connection, the applicant relating to the invention has proposed in Japanese Patent Application No. 122577/1996 an optical wavelength multiplexer/demultiplexer comprising a slit in input waveguides, and K. Okamoto and A. Sugita; Flat spectral response arrayed-waveguide grating multiplexer with parabolic waveguide horns; ELECTRONICS LETTERS, vol. 32 No. 18 pp 1661 to 1662 proposes an optical wavelength multiplexer/demultiplexer wherein the width of the input waveguide is parabolically increased toward the input slab waveguide.

According to the optical wavelength multiplexer/demultiplexer which brings an electric field distribution of signal light to a near rectangular form at the interface of input waveguides and an input slab waveguide, the wavelength characteristics determined by superimposition integral of the electric field distribution of the optical signal and the natural mode of the output waveguides are such that the loss is increased although the transmission band is broadened. Further, since the electric field distribution of an optical signal in a connecting section between the input waveguides and the input slab waveguide is not fully in a rectangular form, the broadening of the wavelength transmission band, the flattening, and the steep rise and fall in the transmission band are unsatisfactory. Therefore, a change in wavelength in a light source unfavorably results in a change in loss.

SUMMARY OF THE INVENTION

Accordingly, an object of the present invention is to provide an optical wavelength multiplexer/demultiplexer which has a wide transmission band and can reduce the loss.

Another object of the present invention is to provide an optical wavelength multiplexer/demultiplexer which can provide wavelength transmission band characteristics of a wide band, good flatness, and steep rise and fall in the transmission band, exhibits only a small change in loss upon a change in wavelength in a light source, and can realize stable multiplexing/demultiplexing of optical signals.

According to the first feature of the invention, a wavelength multiplexer/demultiplexer, comprises: a substrate; and, provided thereon, input waveguides for inputting a wavelength-division multiplexed optical signal, a plurality of output waveguides for demultiplexing and outputting the wavelength-division multiplexed optical signal output from the input waveguides, an array waveguide comprising a plurality of waveguides with a predetermined difference in length being provided between the waveguides, an input slab waveguide for connecting the input waveguides to the array waveguide, and an output slab waveguide for connecting the output waveguides to the array waveguide, the input waveguides being connected to the input slab waveguide through tapered waveguides provided on the input waveguide side and parabolic waveguides provided on the input slab waveguide side.

According to the second feature of the invention, a wavelength multiplexer/demultiplexer, comprises: a substrate; and, provided thereon, input waveguides for inputting a wavelength-division multiplexed optical signal, a plurality of output waveguides for demultiplexing and outputting the wavelength-division multiplexed optical signal, an array waveguide comprising a plurality of waveguides with a difference in length being provided between the waveguides, an input slab waveguide for connecting the input waveguides to the array waveguide, and an output slab waveguide for connecting the array waveguide to the output waveguides, the output slab waveguide having a smaller slab radius than the input slab waveguide, multimode waveguides being provided between the input waveguides and the input slab waveguide.

BRIEF DESCRIPTION OF THE DRAWINGS

The invention will be explained in more detail in conjunction with appended drawings, wherein.

DESCRIPTION OF THE PREFERRED EMBODIMENTS

Before explaining an optical wavelength multiplexer/demultiplexer in the preferred embodiment of the invention, the aforementioned applicant's proposed optical wavelength multiplexer/demultiplexer and the aforementioned conventional wavelength multiplexer/demultiplexer will be explained.

Figure 1A:
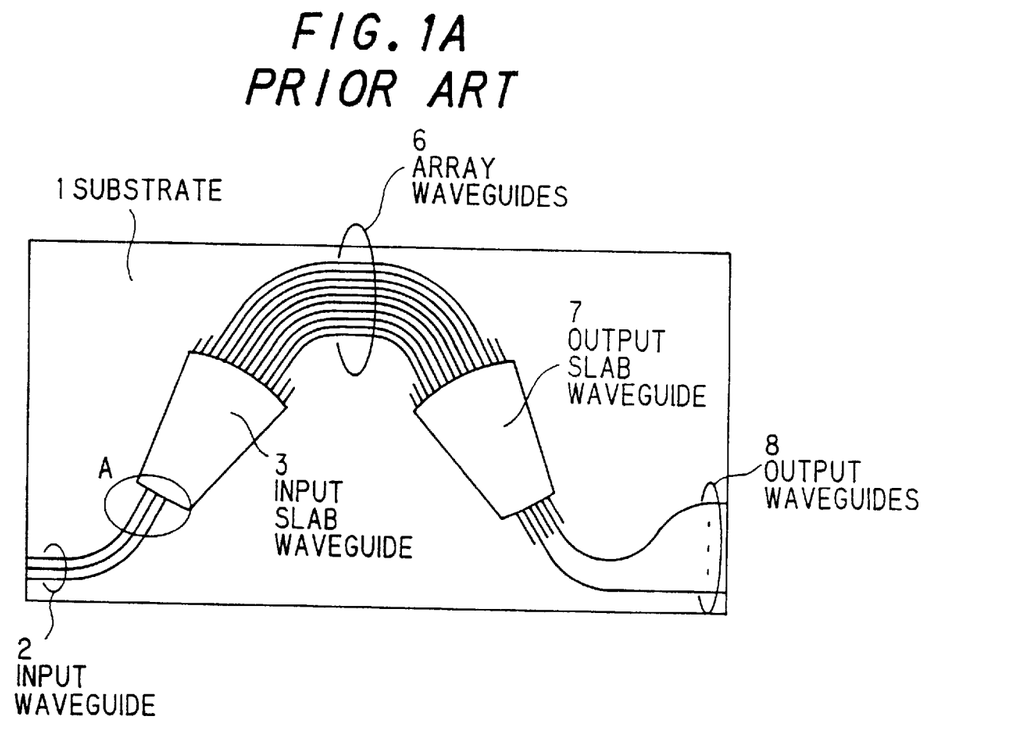
FIG. 1A is a plan view showing an applicant's proposed optical multiplexer/demultiplexer.
Figure 1B:
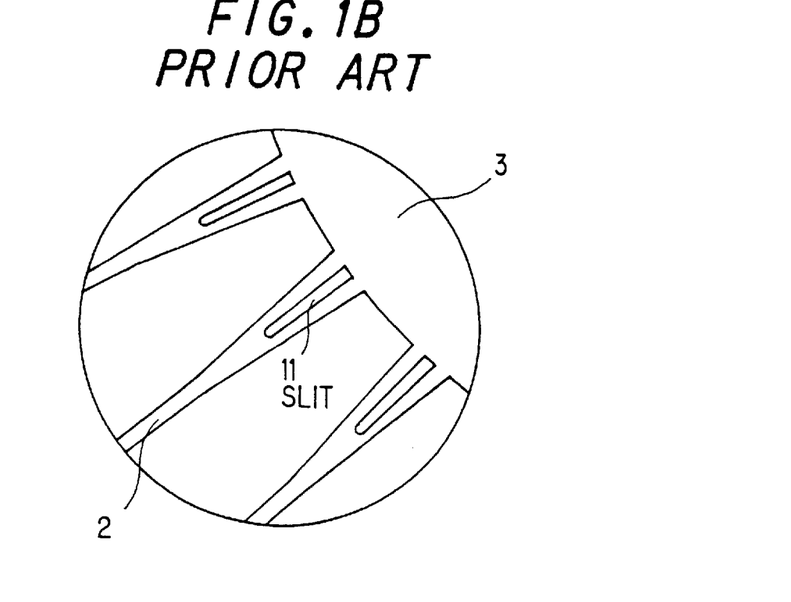
FIG. 1B is an enlarged view of a portion A in FIG. 1A.

FIGS. 1A and 1B show the applicant's proposed optical wavelength multiplexer/demultiplexer which comprises: a substrate 1; and, provided on the substrate 1, a plurality of input waveguides 2, an input slab waveguide 3, an array waveguide 6, an output slab waveguide 7, and output waveguides 8. In this optical wavelength multiplexer/demultiplexer, each of the input waveguides 2 is provided with a slit 11 at a portion interfacing with the slab waveguide 3.

Figure 2A:
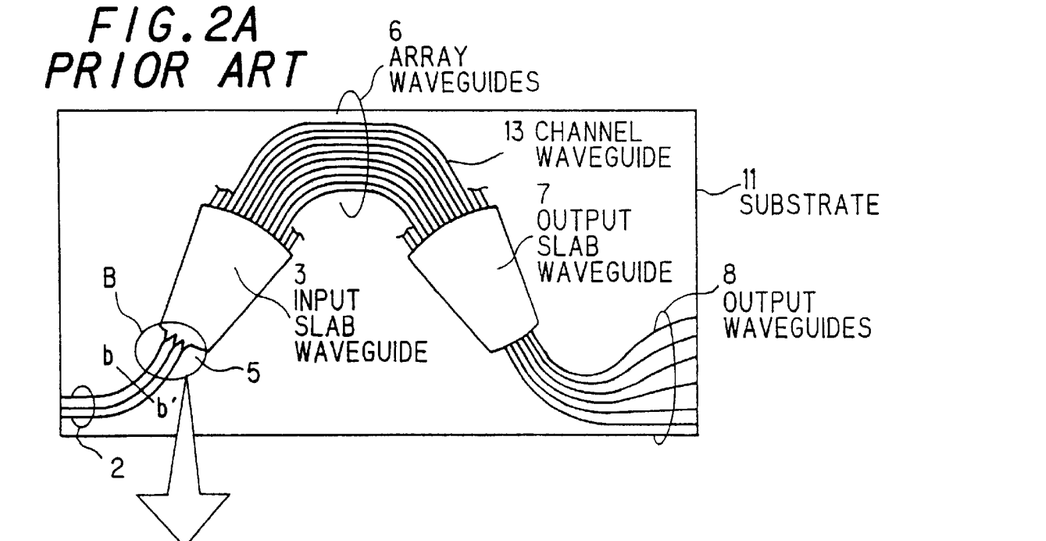
FIG. 2A is a plan view showing a conventional optical multiplexer/demultiplexer.
Figure 2B:
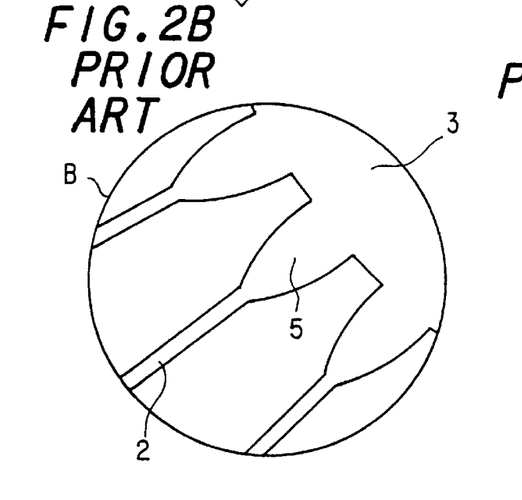
FIG. 2B is an enlarged view of a portion B in FIG. 2A.
Figure 2C:
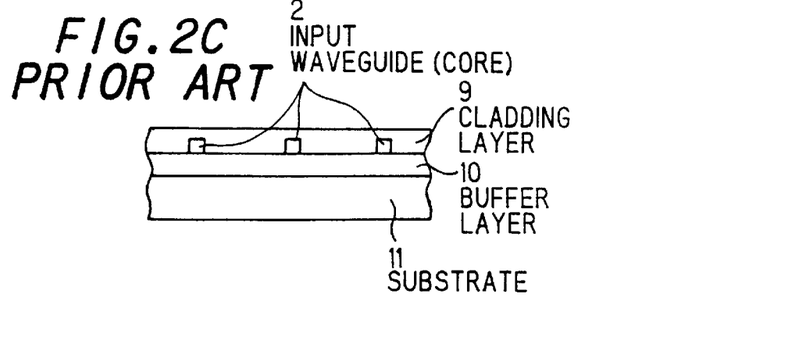
FIG. 2C is a cross-sectional view along the line b-b' in FIG. 2A.

FIG. 2A is a plan view showing a conventional array waveguide diffraction grating type optical waveguide multiplexer/demultiplexer described in "ELECTRONICS LETTERS, Vol. 32 No. 18" published on Aug. 29, 1996, FIG. 2B an enlarged view of a portion B in FIG. 2A, and FIG. 2C a cross-sectional view along the line b-b' in FIG. 2A. This optical wavelength multiplexer/demultiplexer comprises: a substrate 11 made of a semiconductor material, a quartz material or the like; a buffer layer 10 provided on the substrate 11; a cladding layer 9 provided on the buffer layer 10; a plurality of input waveguides (cores) 2 provided in the cladding layer 9; an input slab waveguide 3 for diffusing an optical signal by diffraction; an array waveguide diffraction grating 6 constituted by a plurality of channel waveguides 13 with a difference in length, ΔL, being provided between adjacent channel waveguides; an output slab waveguide 7 for effecting focusing at different positions respectively according to wavelengths; and output waveguides 8 for demultiplexing and outputting the wavelength-division multiplexed optical signal. The input waveguides 2 are connected to the input slab waveguide 3 through waveguides 5 in a parabolic form formed by gradually increasing the width of the input waveguides 2.

Figure 2D:
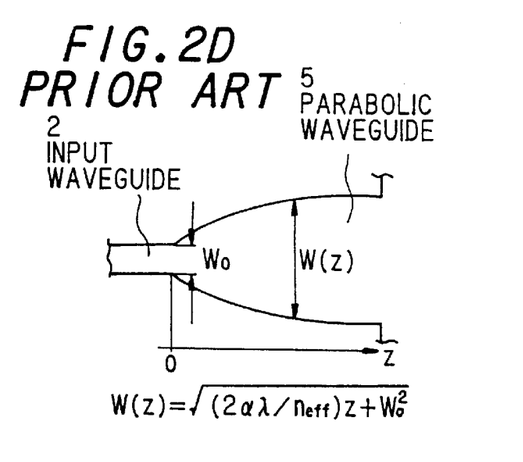
FIG. 2D is an enlarged view of a parabolic configuration waveguide in FIG. 2A.

FIG. 2D shows an increase in core width of the parabolic waveguide 5. The increase in core width of the parabolic waveguide 5 is represented by the following equation:

$$W(z) = \{(2\alpha\lambda/N_{eff})z + W_0^2\}^{1/2}$$

wherein $W_0$ represents the core width of the input waveguide 2; λ represents the wavelength of an optical signal; $N_{eff}$ represents the equivalent refractive index; α represents a constant satisfying 0<α; z represents the distance from the input waveguide 2; and W(z) represents the core width of the parabolic waveguide 5 at the position z.

In operation, a wavelength-division multiplexed optical signal with n waves of wavelengths $\lambda_1$–$\lambda_n$ being multiplexed propagates through the input waveguides 2 and is introduced into the parabolic waveguides 5. The optical signal output from the parabolic waveguides 5 then enters the input slab waveguide 3. The electric field distribution of the optical signal is broadened by the diffraction effect within the input slab waveguide 3, and the optical signal is branched into channel waveguides 13 constituting the array waveguide diffraction grating 6.

The optical signal propagates through the array waveguide diffraction grating 6 and reaches the output slab waveguide 7. In this case, since a difference in length of ΔL is provided between adjacent channel waveguides 13 constituting the array waveguide diffraction grating 6, a predetermined phase difference is created according to the wavelengths $\lambda_1$–$\lambda_n$ of the optical signal in a connecting section between the array waveguide diffraction grating 6 and the output slab waveguide 7. Due to the predetermined phase difference, the focusing position of the optical signal in the output slab waveguide 7 is different for each of the wavelengths $\lambda_1$–$\lambda_n$, and the optical signals focused at respective focusing positions are demultiplexed for each of the wavelengths $\lambda_1$–$\lambda_n$ and are output from the output waveguides 8.

For the optical wavelength multiplexer/demultiplexer used in the wavelength-division multiplexed transmission system, broadening and flattening of the wavelength transmission band and steep rise and fall in the transmission band are important in connection with the wavelength control tolerance of a semiconductor laser source, gain characteristics of an optical fiber amplifier, wavelength characteristics of a dispersive compensating fiber and the like.

In the conventional optical wavelength multiplexer/demultiplexer, in order to realize the broadening and flattening of the wavelength transmission band and steep rise and fall in the transmission band, waveguides 5 in a parabolic form, represented by the above equation, formed by gradually increasing the width of the input waveguides 2 are provided in a connecting section between the input waveguides and the input slab waveguide 3 to increase the width of the input waveguides 2 in a quadratic function manner, thereby bringing the electric field distribution of the optical signal in the connecting section 2 between the input waveguides 2 and the input slab waveguide 3 to as near rectangular as possible form.

Figure 3A:
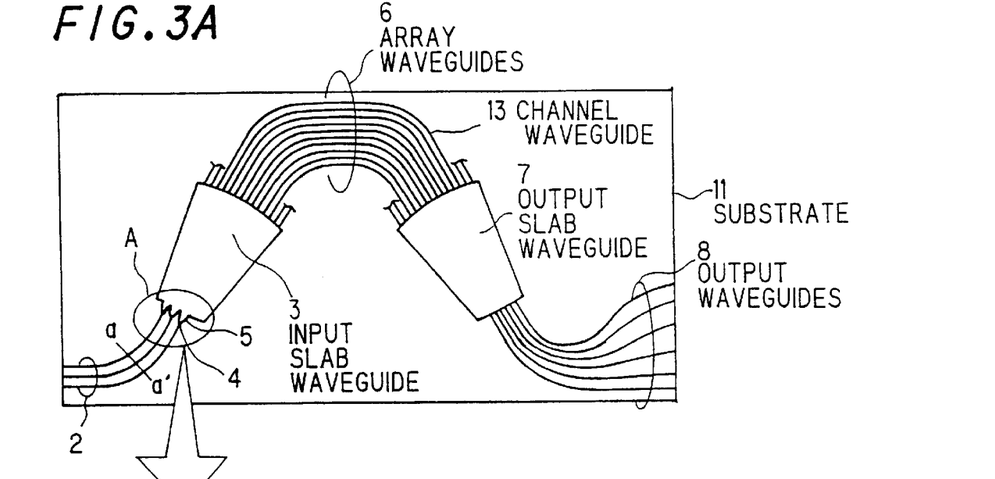
FIG. 3A is a plan view showing an optical wavelength multiplexer/demultiplexer in a first preferred embodiment of the invention.
Figure 3B:
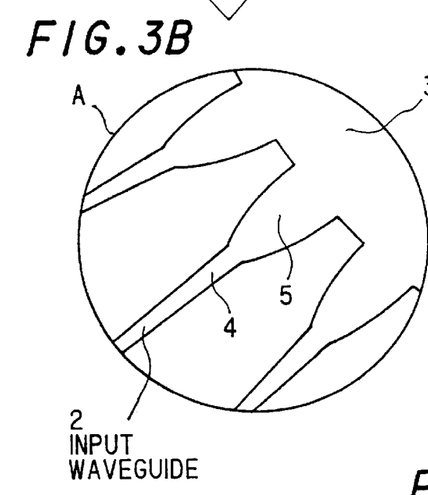
FIG. 3B is an enlarged view of a portion A in FIG. 3A.

Next, an optical wavelength multiplexer/demultiplexer in the first preferred embodiment of the invention will be explained in FIGS. 3A to 3C.

The optical wavelength multiplexer/demultiplexer of the present invention comprises: a substrate 11 made of a semiconductor material, a quartz material or the like; a buffer layer 10 provided on the substrate 11; a cladding layer 9 provided on the buffer layer 10; a plurality of input waveguides (cores) 2 provided in the cladding layer 9; an input slab waveguide 3; an array waveguide diffraction grating 6 constituted by a plurality of channel waveguides 13 with a difference in length, ΔL, being provided between adjacent channel waveguides; an output slab waveguide 7; and output waveguides 8. The input waveguides 2 are connected to the input slab waveguide 3 through waveguides 4 in a taper form (tapered waveguides) formed by gradually increasing the width of the input waveguides 2 and waveguides 5 in a parabolic form (parabolic waveguides). In the taper in the tapered waveguides 4, the width of the input waveguides 2 may be gradually decreased instead of gradual increase.

Figure 3C:
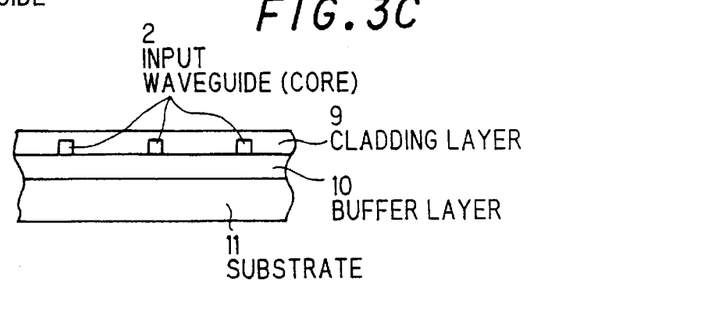
FIG. 3C is a cross-sectional view along the line a-a' in FIG. 3A.
Figure 3D:
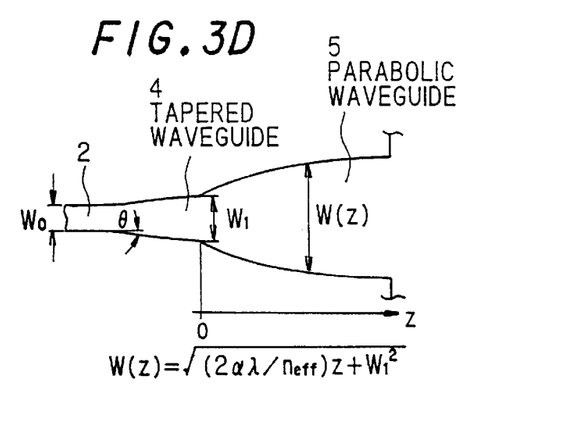
FIG. 3D is an enlarged view of taper and parabolic configuration waveguides in FIG. 3A.

FIG. 3D shows an increase in core width in the tapered waveguide 4 and the parabolic waveguide 5. The tapered waveguide 4 is formed by a linear increase (or decrease) in width from the width $W_0$ of the input waveguide 2 to the width $W_1$ of the input section of the parabolic waveguide 5 at a predetermined inclination angle θ.

The increase in core width of the parabolic waveguide 5 is represented by the following equation:

$$W(z) = \{(2\alpha\lambda/N_{\mathit{eff}})z + W_1^2\}^{1/2}$$

wherein $W_1$ represents the core width of the connecting section between the tapered waveguide 4 and the parabolic waveguide 5; λ represents the wavelength of an optical signal; $N_{\mathit{eff}}$ represents the equivalent refractive index; α represents a constant satisfying 0<α; z represents the distance from the input waveguide 2; and W(z) represents the core width of the parabolic waveguide 5 at the position z.

In operation, a wavelength-division multiplexed optical signal with n waves of wavelengths $\lambda_1$–$\lambda_n$ being multiplexed propagates through the input waveguides 2 and is introduced into the input slab waveguide 3 through the tapered waveguides 4 and the parabolic waveguides 5. The optical signal input into the input slab waveguide 3 is not confined in a horizontal direction within the input slab waveguide 3, permitting the electric field to be broadened by the diffraction effect. As a result, the optical signal is branched into channel waveguides 13 constituting the array waveguide diffraction grating 6.

The optical signal propagates through the array waveguide diffraction grating 6 and reaches the output slab waveguide 7. In this case, since a difference in length of ΔL is provided between adjacent channel waveguides 13 constituting the array waveguide diffraction grating 6, a predetermined phase difference is created according to the wavelengths $\lambda_1$–$\lambda_n$ of the optical signal in a connecting section between the array waveguide diffraction grating 6 and the output slab waveguide 7. Due to the predetermined phase difference, the focusing position of the optical signal in the output slab waveguide 7 is different for each of the wavelengths $\lambda_1$–$\lambda_n$, and the optical signals focused at respective focusing positions are demultiplexed for each of the wavelengths $\lambda_1$–$\lambda_n$ and are output from the output waveguides 8.

Figure 4:
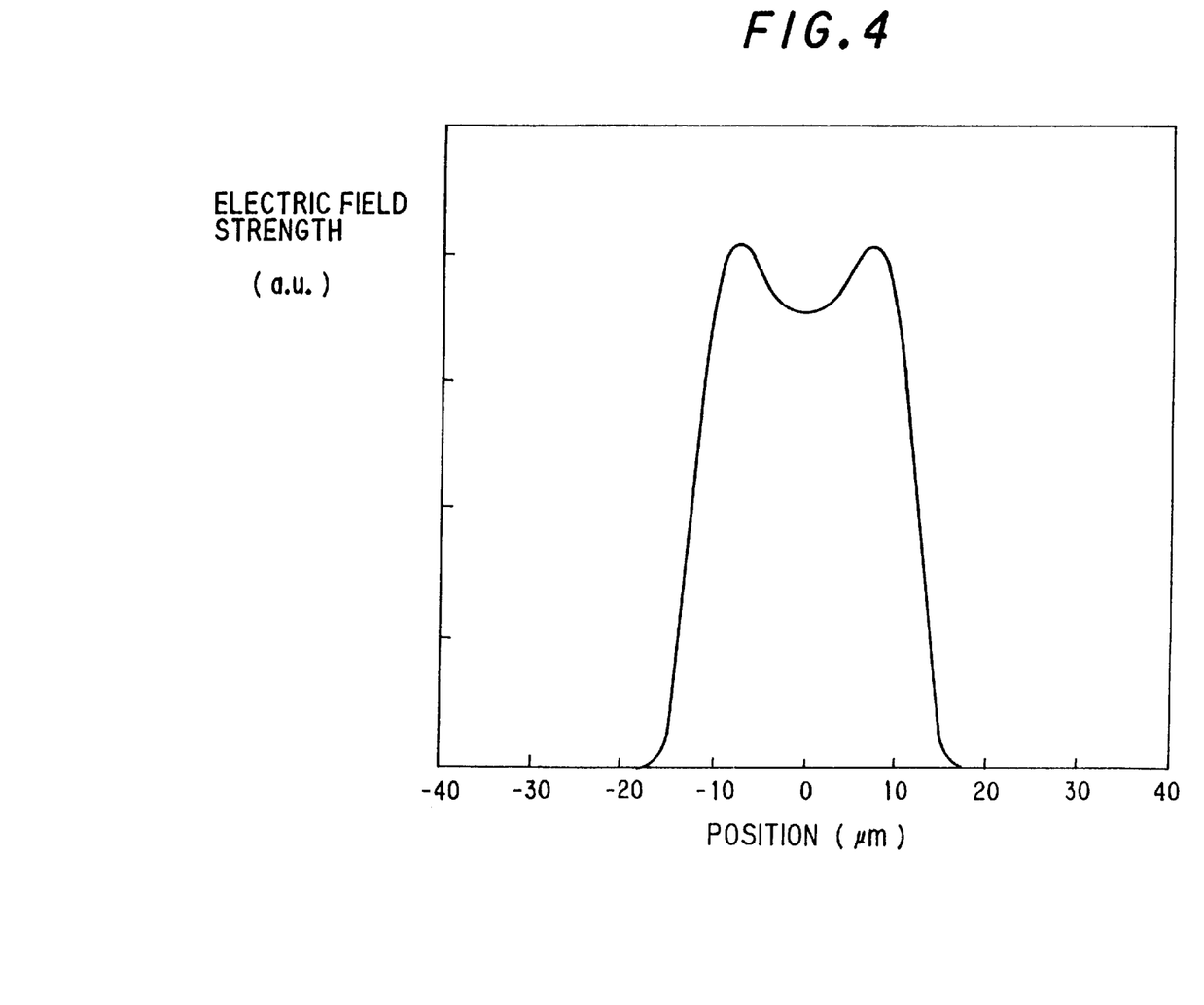
FIG. 4 is an explanatory diagram showing an electric field distribution of the optical wavelength multiplexer/demultiplexer in FIGS. 3A to 3D.

FIG. 4 shows an electric field distribution of the optical signal which has been output from the input waveguides 2 and input into the input slab waveguide 3 through the tapered waveguides 4 and the parabolic waveguides 5. In FIG. 4, the electric field distribution of the optical signal input into the input slab waveguide 3 corresponds to a change in refractive index distribution of the tapered waveguides 4 and the parabolic waveguides 5 and is in a very near rectangular form.

In this case, since the input slab waveguide 3 and the output slab waveguide 7 function as a lens, the electric field distribution, immediately before the output waveguides 8, of the optical signal focused in the output slab waveguide 7 is substantially equal to the electric field distribution of the optical signal input into the input slab waveguide 3 and is in a very near rectangular form.

The signal light intensity of the optical signal input into the output waveguides 8 is determined by superimposition integral of the electric field distribution of the optical signal and the natural mode of the output waveguides 8. The value of the superimposition integral changes according to the shift of the focusing position of the optical signal according to the phase difference created by the array waveguide diffraction grating 6 and the wavelengths $\lambda_1$ to $\lambda_n$ of the optical signal. For this reason, the wavelength loss characteristics of the optical signal intensity input into the output waveguides 8 become a rectangular form, offering such wavelength transmission band characteristics that the wavelength transmission band has been broadened and flattened and has steep rise and fall.

Figure 5A:
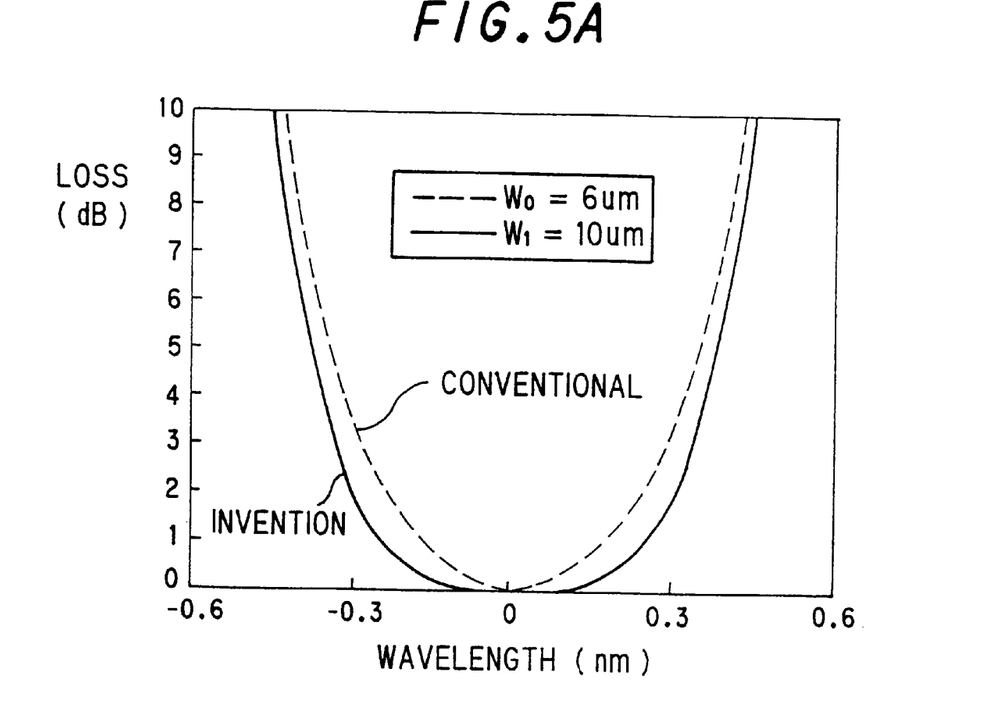
FIGS. 5A and 5B are explanatory diagrams showing loss characteristics relative to wavelengths of the optical wavelength multiplexer/demultiplexer in FIGS. 3A to 3D as compared to those of the conventional optical wavelength multiplexer/demultiplexer.
Figure 5B:
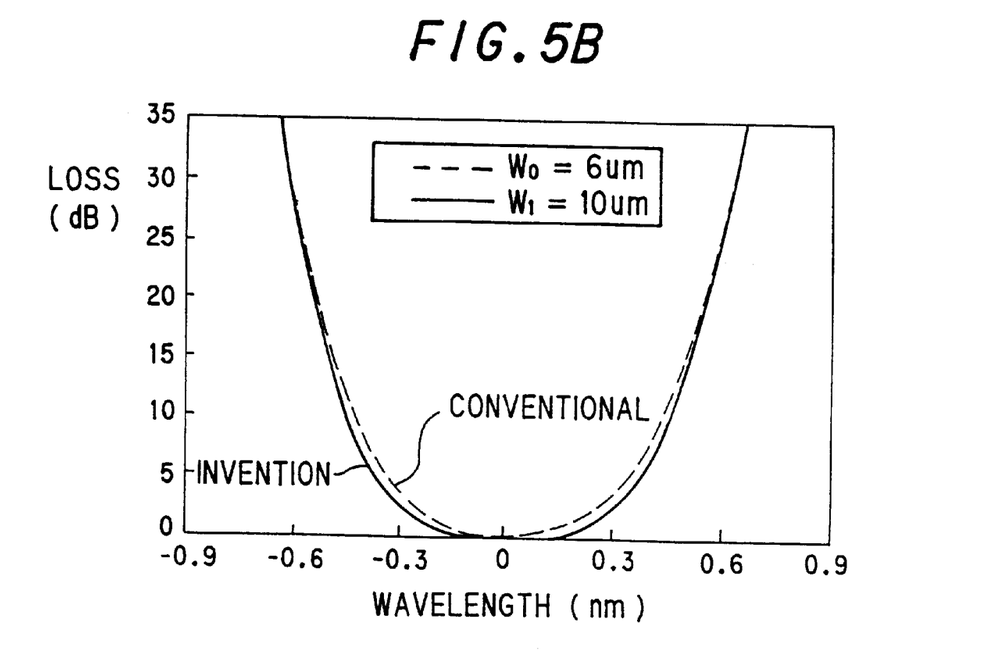

FIGS. 5A and 5B are diagrams showing the loss wavelength characteristics of the optical wavelength multiplexer/demultiplexer, of the invention, with the taper of the tapered waveguide 4 being widened toward the parabolic waveguide, in comparison with the loss wavelength characteristics of the conventional optical wavelength multiplexer/demultiplexer. In this case, the refractive index of the cladding layer 9, $n_{cl}$, was 1.4574, the refractive index of the core 2, $n_{co}$, was 1.4692, the specific refractive index difference, Δ, was 0.8%, the dimension of the section of the channel waveguide 13 was 6×6 μm², and the demultiplexing spacing of the optical signal, Δλ, was 0.8 nm (100 GHz). Further, the angle of divergence of taper in the tapered waveguide 4, θ, was 0.5°, the maximum core width of the parabolic waveguide 5, $W_{max}$, was 30 μm, the constant, α, was 1.0, the core width of the input waveguide 2, $W_0$, was 6 μm, and the core width of the connecting section between the tapered waveguide 4 and the parabolic waveguide 5, $W_1$, was 10 μm. Further, for comparison of the conventional optical wavelength multiplexer/demultiplexer with the optical wavelength multiplexer/demultiplexer of the invention, normalization was carried out with the minimum loss being zero.

In FIGS. 5A and 5B, for the conventional optical wavelength multiplexer/demultiplexer (not provided with the tapered wavelength 4: $W_0$=6 μm), the 1 dB band width was about 0.32 nm (FIG. 5A), and the 25 dB band width was about 1.15 nm (FIG. 5B), whereas, in the optical wavelength multiplexer/demultiplexer (provided with the tapered waveguide 4: $W_1$=10 μm) of the invention, the 1 dB band width was about 0.50 nm (FIG. 5A), and the 25 dB band width was about 1.16 nm (FIG. 5B), indicating that, as compared with the conventional optical wavelength multiplexer/demultiplexer, the optical wavelength multiplexer/demultiplexer of the invention can offer such wavelength loss characteristics that the form is closer to a rectangle, more flat, and has more steep rise and fall.

Figure 6A:
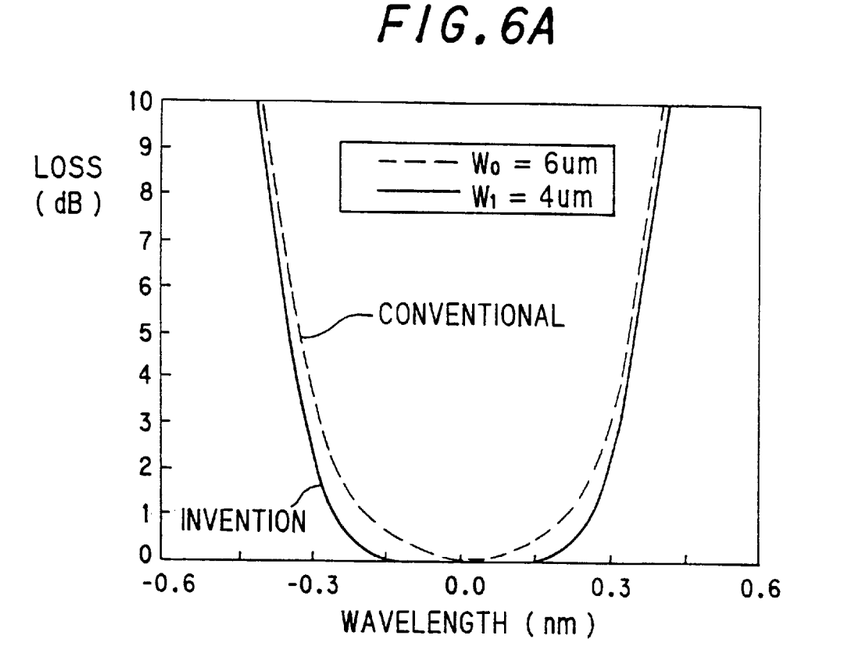
FIGS. 6A and 6B are explanatory diagrams showing loss characteristics relative to wavelengths of the same optical wavelength multiplexer/demultiplexer as shown in FIGS. 3A to 3D, except that the tapered waveguides are formed by gradually decreasing the width of the input waveguides, as compared to those of the conventional optical wavelength multiplexer/demultiplexer.
Figure 6B:
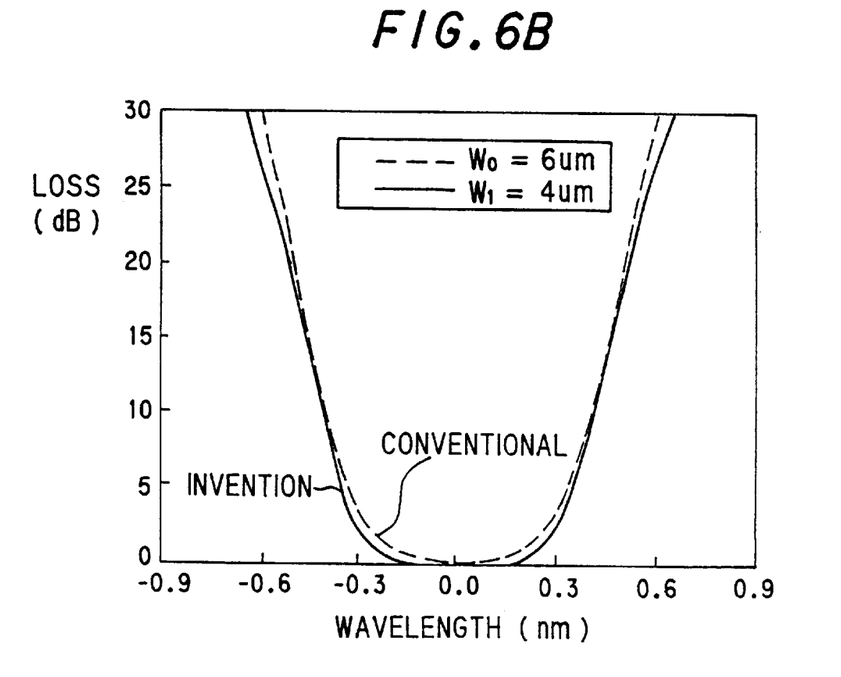

FIGS. 6A and 6B are diagrams showing the loss wavelength characteristics of the optical wavelength multiplexer/demultiplexer, of the invention, with the taper of the tapered waveguide 4 being narrowed toward the parabolic waveguide, in comparison with the loss wavelength characteristics of the conventional optical wavelength multiplexer/demultiplexer. In this case, the refractive index of the cladding layer 9, $n_{cl}$, was 1.4574, the refractive index of the core 2, $n_{co}$, was 1.4692, the specific refractive index difference, Δ, was 0.8%, the dimension of the section of the channel waveguide 13 was 6×6 μm², and the demultiplexing spacing of the optical signal, Δλ, was 0.8 nm (100 GHz). Further, the angle of convergence of taper in the tapered wavelength 4, θ, was 0.5°, the maximum core width of the parabolic waveguide 5, $W_{max}$, was 25 μm, the constant, α, was 1.5, the core width of the input waveguide 2, $W_0$, was 6 μm, and the core width of the connecting section between the tapered waveguide 4 and the parabolic waveguide 5, $W_1$, was 4 μm. Further, for comparison of the conventional optical wavelength multiplexer/demultiplexer with the optical wavelength multiplexer/demultiplexer of the invention, normalization was carried out with the minimum loss being zero.

In FIGS. 6A and 6B, for the conventional optical wavelength multiplexer/demultiplexer (not provided with the tapered wavelength 4: $W_0=6$ μm), the 1 dB band width was about 0.39 nm (FIG. 6A), and the 25 dB band width was about 1.12 nm (FIG. 6B), whereas, in the optical wavelength multiplexer/demultiplexer (provided with the tapered waveguide 4: $W_1=4$ μm) of the invention, the 1 dB band width was about 0.52 nm (FIG. 6A), and the 25 dB band width was about 1.18 nm (FIG. 6B), indicating that, as compared with the conventional optical wavelength multiplexer/demultiplexer, the optical wavelength multiplexer/demultiplexer of the invention can offer such wavelength loss characteristics that the form is closer to a rectangle, more flat, and has more steep rise and fall.

As described above, in the optical wavelength multiplexer/demultiplexer of the invention, an optical structure, that is, which tapered waveguide 4 is used, a tapered waveguide with a taper widened toward the parabolic waveguide or a tapered waveguide with a taper narrowed toward the parabolic waveguide, may be determined according to the design parameter of each waveguide.

In connection with the above preferred embodiment of the invention, it is also possible to the above optical wavelength multiplexer/demultiplexer on a quartz glass substrate, a semiconductor substrate or the like. Further, the core 2, the cladding layer 9, and the buffer layer 10 also may be made of an optically transparent material, such as a glass material or a semiconductor material. The buffer layer 10 between the substrate material 11 and the cladding layer 9 may be omitted.

In the above preferred embodiment of the invention, the optical length multiplexer/demultiplexer has been described as a demultiplexer. When a plurality of optical signals are input through the output waveguides 8, the optical length multiplexer/demultiplexer can be used as a multiplexer wherein a wavelength multiplexed optical signal is output from the input waveguides 2.

As described above, according to the optical wavelength multiplexer/demultiplexer of the invention, parabolic waveguides are provided in a connection section between the input waveguides and the input slab waveguide, and, in addition, tapered waveguides are provided between the input waveguides and the parabolic waveguides. This can offer such wavelength loss characteristics that the form is rectangular and flat and has steep rise and fall. In addition, this can realize stable multiplexing/demultiplexing of an optical signal without significant loss variation even upon a variation in wavelength of a light source.

Figure 7A:
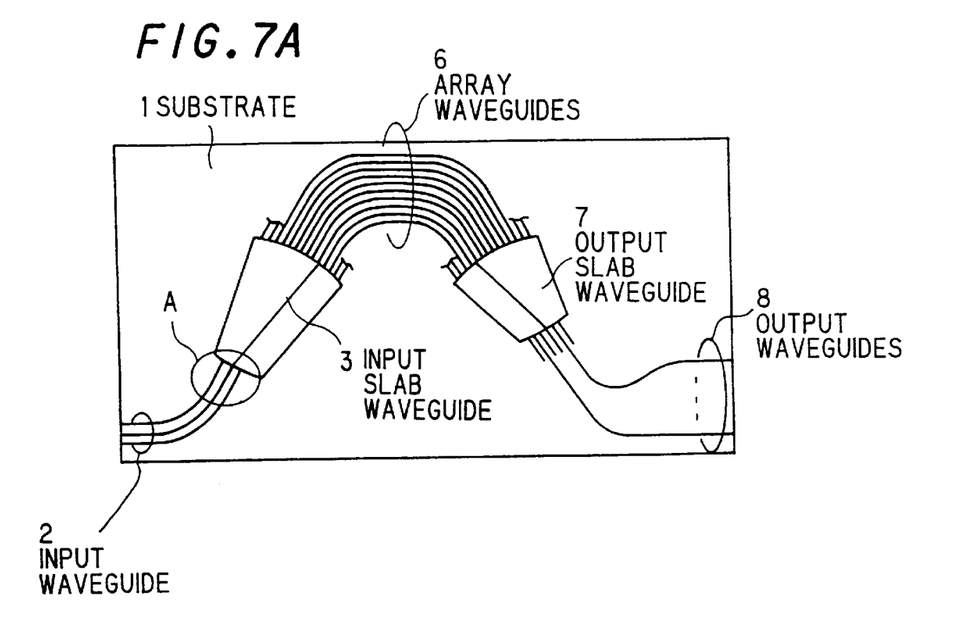
FIG. 7A is a plan view showing an optical wavelength multiplexer/demultiplexer in a second preferred embodiment of the invention.
Figure 7B:
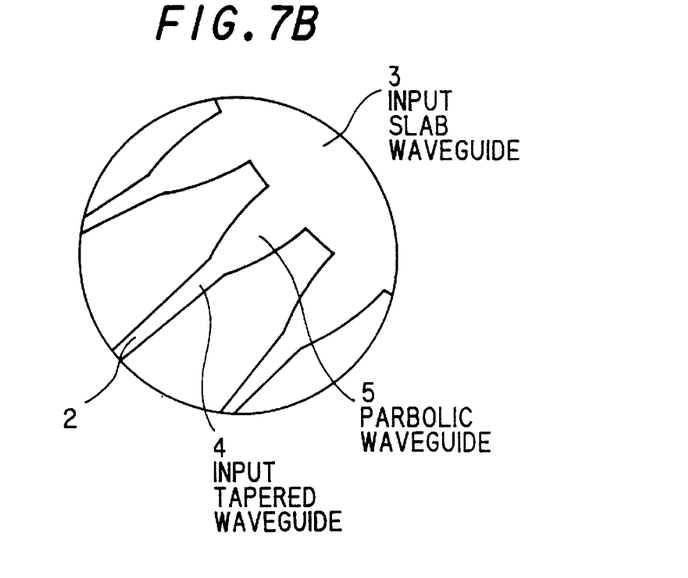
FIG. 7B is an enlarged view of a portion A in FIG. 7A.

FIGS. 7A and 7B show an optical wavelength multiplexer/demultiplexer in the second preferred embodiment of the invention.

As shown in FIGS. 7A and 7B, the optical wavelength multiplexer/demultiplexer comprises: a substrate 1; a plurality of input waveguides 2; an input slab waveguide 3 having a radius of curvature, Ri; an input tapered waveguide 4; a parabolic waveguide 5; an array waveguide 6 comprising waveguides with a difference in length, ΔL, being provided between adjacent waveguides; an output slab waveguide 7 having a radius of curvature, Ro; and a plurality of output waveguides 8.

This optical wavelength multiplexer/demultiplexer has an asymmetric slab structure wherein the radius of curvature of the slab waveguide on the input side is different from that of the slab waveguide on the output side, that is, is constructed so that the radius of curvature, Ro, on the output slab waveguide 7 is smaller than the radius of curvature, Ri, of the input slab waveguide 3. Further, multimode waveguides, such as input tapered waveguides 4 and parabolic waveguides 5, are provided between each of the input waveguides 2 and the input slab waveguide 3.

As shown in FIG. 3D, for the input tapered waveguide 4, one end thereof has the same width as the input waveguide 2 and is connected to the input waveguide 2, and the width is increased this one end toward the other end at a given angle θ. For the parabolic waveguide 5, one end has the same width as the end on the larger width side of the input tapered waveguide 4 and is connected to the input tapered waveguide 4. When this width of the end is $W_0$, the width is broadened so that the width W (z) at a position z in the longitudinal direction (direction z) is one represented by the following equation:

$$W(z) = \sqrt{(2\alpha\lambda/n_{eff})z + W_0^2}$$

The end on the larger width side of the parabolic waveguide 5 is connected to the input slab waveguide 3.

Further, as shown in FIG. 3C, the optical wavelength multiplexer/demultiplexer comprises: a substrate 1 made of silicon or the like; a buffer layer 10, made of quartz glass, provided on the substrate 1; and, provided on the buffer layer 10, cores 2 and a clad 9 for covering the cores 2 which serve as the waveguides.

When the substrate 1 is made of quartz glass, the buffer layer 10 may be omitted.

The flow of signal light will be described step by step.

When a wavelength multiplexed optical signal light enters the input slab waveguide 3 through the input waveguide 2, the signal light is first passed through the input tapered waveguide 4 and the parabolic waveguide 5 and then reaches the input slab waveguide 3. The signal light is not confined in a horizontal direction (a widthwise direction of the waveguide) within the input slab waveguide 3, permitting signal light to be broadened, and the broadened signal light is then guided into the array waveguide 6.

In the array waveguide 6, a phase difference is created in the signal light based on the difference in length between the waveguides. Thereafter, the signal light is input into the output slab waveguide 7. In this case, since the phase difference created by the array waveguide 6 is different for each wavelength, the wavelength multiplexed signal light is focused at a different position for each wavelength. The signal light propagates through different waveguides 8 for respective wavelengths and is output from the output waveguides 8.

In the above case, when the signal light propagates through the input slab waveguide 3, the electric field distribution corresponds to a change in refractive index distribution of the input tapered waveguide 4 and the parabolic waveguides 5, and the distribution becomes a near rectangular form as shown in FIG. 4.

The two slab waveguides, the input slab waveguide 3 and the output slab waveguide 7, each function as a lens. In this case, since they are different in each other in radius of curvature, the electric field distribution at the interface of the input slab waveguide 3 and the parabolic waveguides 5 is not reproduced at the interface of the output slab waveguide 7 and the output waveguides 8. The electric field distribution in the latter is Ro/Ri times in the direction of x (widthwise direction of the waveguide). Since the radius of curvature Ro is smaller than the radius of curvature Ri, the electric field distribution immediately before the output waveguide 8 is one which has been reduced in the direction of x. Therefore, the wavelength characteristics determined by superimposition integral of the electric field distribution immediately before the output waveguide 8 and the natural mode of the output waveguide are maintained in a rectangular form, that is, so that a characteristic curve prepared by plotting wavelength as abscissa against loss as ordinate is in a near rectangular form. In addition, the loss is lowered.

Figure 8:
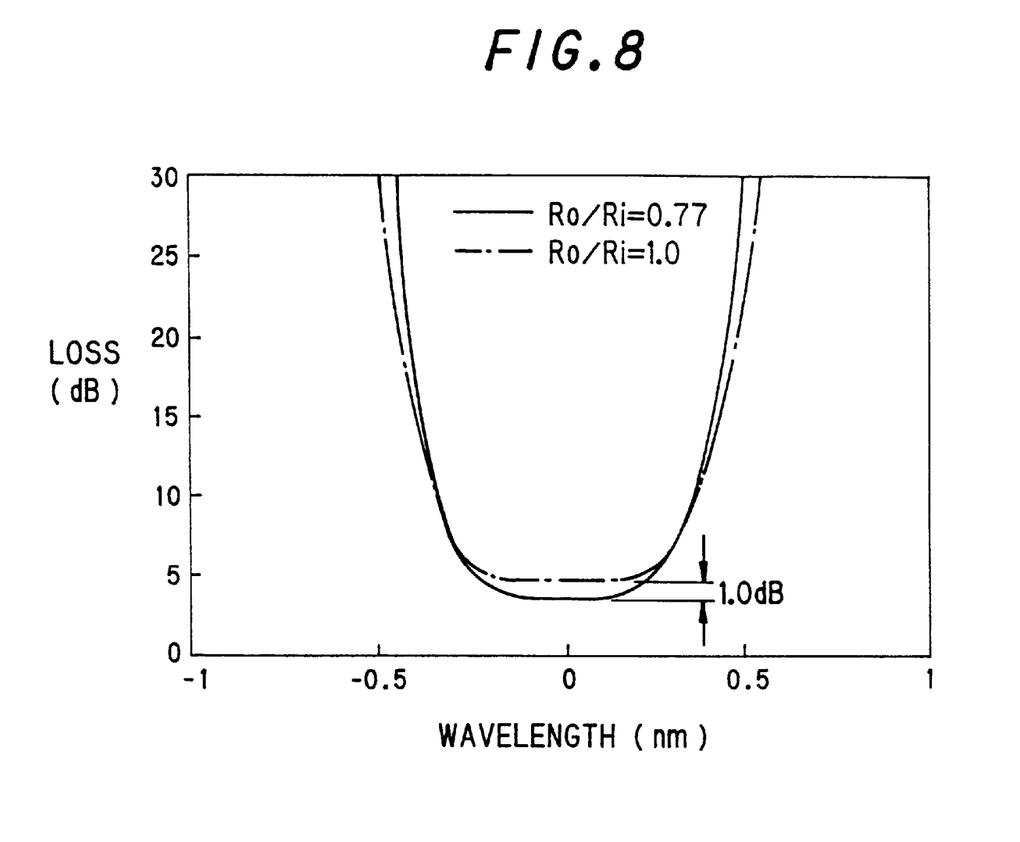
FIGS. 8 and 9 are explanatory diagrams showing loss characteristics relative to wavelengths of the optical wavelength multiplexer/demultiplexer in FIGS. 7A and 7B as compared to the conventional optical wavelength multiplexer/demultiplexer.

FIG. 8 shows the results of simulation of the wavelength characteristics of the array waveguide diffraction grating type optical wavelength multiplexer/demultiplexer according to the invention. In the simulation, the refractive index of the cladding, $n_{cl}$, was 1.4574, the refractive index of the core, $n_{co}$, was 1.4692, the specific refractive index difference, $\Delta$, was 0.8%, and the dimension of the section of the channel waveguide was 6×6 $\mu m^2$. Further, the angle of divergence of taper in the input tapered waveguide 4, θ, was 0.5°, the core width of the parabolic waveguide 5 in its input section, $W_0$, was 8 $\mu m$, the maximum core width of the parabolic waveguide 5 was 30 $\mu m$, and the constant, α, was 1.5. The demultiplexing spacing in terms of frequency was 100 GHz (the demultiplexing spacing in terms of wavelength, $\Delta\lambda$, being 0.8 nm).

In FIG. 8, two curves are shown. One of the curve shows data for a ratio of the radius of curvature Ro of the output slab waveguide 7 to the radius of curvature Ri of the input slab waveguide 3, that is, Ro/Ri, of 0.77 (invention: solid line), and the other curve shows data for an Ro/Ri of 1.00 (comparative example: broken line). As is apparent from the drawing, the loss in the invention is about 1.0 dB lower than that in the comparative example. In this case, the 3 dB band width in the invention was 0.59 nm, that is, substantially equal to that in the comparative example (3 dB band width: 0.63 nm).

Next, the preparation on an experimental scale of the array waveguide diffraction grating type optical wavelength multiplexer/demultiplexer according to the invention will be described. A quartz glass substrate was used as the substrate 1. The core 12 was formed from quartz glass with titanium added thereto. In this case, the refractive index of the cladding, $n_{cl}$, was 1.4574, the refractive index of the core, $n_{co}$, was 1.4692, the specific refractive index difference, $\Delta$, was 0.8%, and the dimension of the section of the channel waveguide was 6×6 $\mu m$. Further, the angle of divergence of taper in the input tapered waveguide 4, θ, was 0.5°, the core width of the parabolic waveguide 5 in its input section, $W_0$, was 8 $\mu m$, the maximum core width of the parabolic waveguide 5 was 30 $\mu m$, and the constant, α, was 1.5. The radius of the slab was Ri=Ro=14.5 m (Ro/Ri=1) for the symmetrical slab structure (comparative example). On the other hand, in the case of the asymmetrical slab structure (invention), the radius of curvature of the input slab waveguide 3, Ri, was 14.5 m, and the radius of curvature of the output slab waveguide 7, Ro, was 11.2 m (Ro/Ri=0.77). The number of arrays was 180 for both the symmetrical slab structure and the asymmetrical slab structure. In order to bring the demultiplexing spacing in terms of frequency to 100 GHz (the demultiplexing spacing in terms of wavelength, $\Delta\lambda$: 0.8 nm), the output waveguide pitch in the asymmetrical slab structure was brought to 0.77 time the output waveguide pitch in the symmetrical slab structure.

Figure 9:
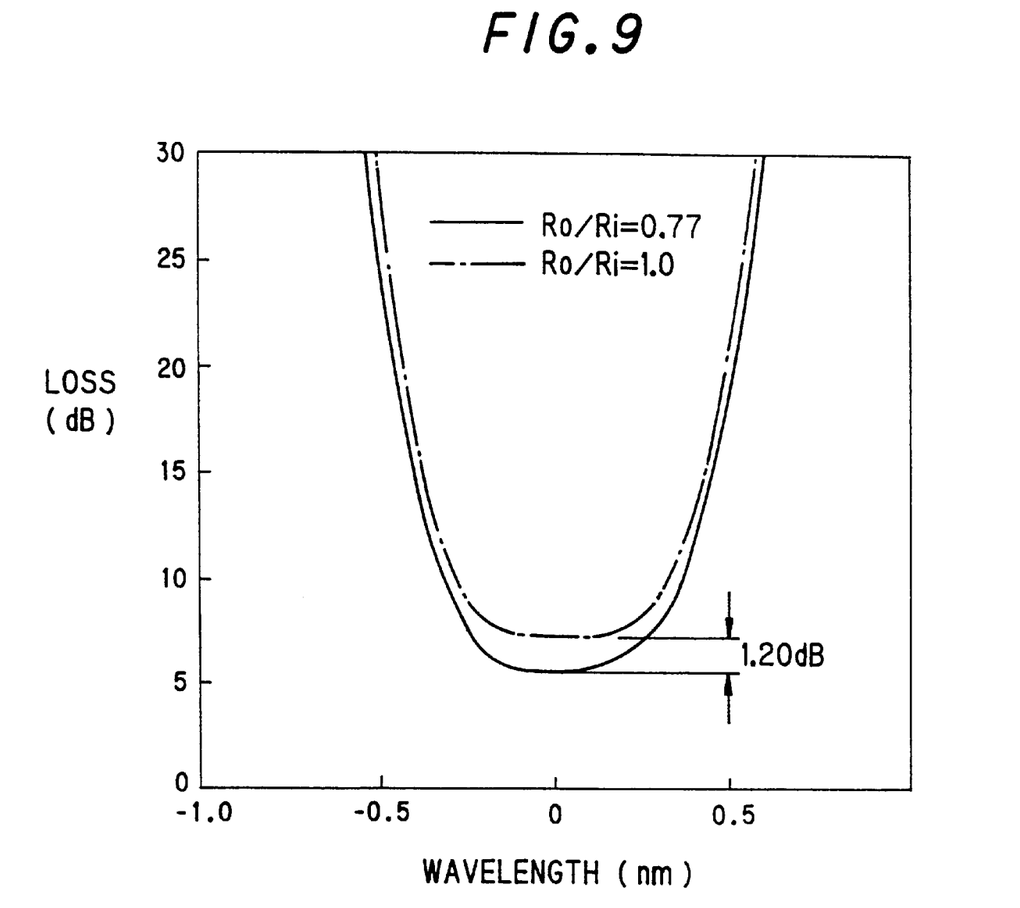

FIG. 9 shows wavelength loss characteristics of the device prepared above on an experimental scale. As is apparent from FIG. 9, for the symmetrical structure (comparative example: broken line), the loss was 6.89 dB, the 3 dB band width was 0.63 nm, and the 20 dB band width was 1.08 nm, whereas, for the asymmetrical structure (invention: solid line), the loss was 5.63 dB, the 3 dB band width was 0.63 nm, and the 20 dB band width was 1.11 nm. Thus, according to the present invention, the wavelength characteristics can be maintained so as for the characteristic curve to be in a rectangular form, and, in addition, the loss was lowered by 1.26 dB.

Further, the asymmetrical slab structure as adopted in the invention can reduce the radius of the output slab waveguide 7, offering an advantage that the size of the device can be reduced.

In the above preferred embodiment, waveguides having a parabolic structure was provided between the input waveguides 2 and the input slab waveguide 3. The invention, however, is not limited to this embodiment only. For example, a slit structure or other multimode waveguide may be used as means for bringing the electric field distribution at the interface of the input waveguides 2 and the input slab waveguide 3 brought to a near rectangular form.

As described above, in an array waveguide diffraction grating type wavelength optical multiplexer/demultiplexer having a construction for bringing the electric field distribution at the interface of the input waveguides and the input slab waveguide brought to a near rectangular form, when the slab radius of the output slab waveguide is made smaller than the slab radius of the input slab waveguide, the loss can be lowered while maintaining high flatness and wideness of the transmission band.

The invention has been described in detail with particular reference to preferred embodiments, but it will be understood that variations and modifications can be effected within the scope of the present invention as set forth in the appended claims.

What is claimed is:

1. An optical wavelength multiplexer/demultiplexer, comprising: a substrate; and, provided thereon, input waveguides for inputting a wavelength-division multiplexed optical signal, a plurality of output waveguides for demultiplexing and outputting the wavelength-division multiplexed optical signal output from the input waveguides, an array waveguide comprising a plurality of waveguides with a predetermined difference in length being provided between the waveguides, an input slab waveguide for connecting the input waveguides to the array waveguide, and an output slab waveguide for connecting the output waveguides to the array waveguide, the input waveguides being connected to the input slab waveguide through tapered waveguides provided on the input waveguide side and parabolic waveguides provided on the input slab waveguide side.

2. The optical wavelength multiplexer/demultiplexer according to claim 1, wherein the tapered waveguides each have a core width broadened from the input waveguide toward the parabolic waveguide.

3. The optical wavelength multiplexer/demultiplexer according to claim 1, wherein the tapered waveguides each have a core width narrowed from the input waveguide toward the parabolic waveguide.

4. An optical wavelength multiplexer/demultiplexer, comprising: a substrate; and, provided thereon, input waveguides for inputting a wavelength-division multiplexed optical signal, a plurality of output waveguides for demultiplexing and outputting the wavelength-division multiplexed optical signal, an array waveguide comprising a plurality of waveguides with a difference in length being provided between the waveguides, an input slab waveguide for connecting the input waveguides to the array waveguide, and an output slab waveguide for connecting the array waveguide to the output waveguides, the output slab waveguide having a smaller slab radius than the input slab waveguide, multimode waveguides being provided between the input waveguides and the input slab waveguide.

5. The optical wavelength multiplexer/demultiplexer according to claim 4, wherein the input waveguides are provided with a slit.

* * * * *